US006830411B1

(12) United States Patent
Amari

(10) Patent No.: US 6,830,411 B1
(45) Date of Patent: Dec. 14, 2004

(54) ARTIFICIAL ISLAND AND METHOD OF CONSTRUCTION THEREOF

(76) Inventor: Dominick Amari, 317 Battle Ave., Franklin, TN (US) 37064

(*) Notice: Subject to any disclaimer, the term of this patent is extended or adjusted under 35 U.S.C. 154(b) by 0 days.

(21) Appl. No.: 10/718,246

(22) Filed: Nov. 18, 2003

(51) Int. Cl.[7] .............................. E02B 3/04; E02B 3/06; E01F 7/02
(52) U.S. Cl. ............................ 405/15; 405/21; 405/30; 405/32; 405/302.6; 256/13
(58) Field of Search .............................. 405/15, 21, 22, 405/29, 30, 31–35, 302.6; 256/13, 19

(56) References Cited

U.S. PATENT DOCUMENTS

| | | | | |
|---|---|---|---|---|
| 1,844,484 A | * | 2/1932 | Smith .......................... | 405/32 |
| 4,710,057 A | * | 12/1987 | Laier .......................... | 405/30 |
| 5,269,254 A | * | 12/1993 | Gagliano et al. ............. | 405/32 |
| 5,720,573 A | * | 2/1998 | Benedict et al. ............. | 405/21 |
| 5,732,935 A | * | 3/1998 | Codario, Jr. ................ | 256/31 |
| 5,807,024 A | * | 9/1998 | Benedict ..................... | 405/32 |
| 5,944,443 A | * | 8/1999 | Benedict ..................... | 405/21 |
| 6,499,911 B2 | * | 12/2002 | Hilliard et al. ............. | 405/32 |

FOREIGN PATENT DOCUMENTS

| | | | | |
|---|---|---|---|---|
| JP | 63047406 | * | 2/1988 | .................. 405/21 |
| JP | 2000316415 | * | 11/2000 | |

* cited by examiner

Primary Examiner—Jong-Suk (James) Lee
(74) Attorney, Agent, or Firm—Michael J. Tavella

(57) ABSTRACT

A method of making artificial barrier islands or break waters. The method consists of driving a series of piles in the shape of the island, attaching a number of wire mesh sections, to form a fence around the perimeter of the piles, connecting the tops of the piles with cables, and then filling the formed enclosure with riprap (rock) material. Once the rock has reached the water surface, it is covered with suitable soil and vegetation to create the island. The piles and mesh are hidden below the water surface and the formed island takes on a natural appearance. In this way, the artificial island is a barrier to storms, thus protecting the shoreline and wetlands from erosion. Moreover, the artificial island creates an ideal habitat for birds, fish, reptiles and amphibians. In certain environments one island can protect approximately 10 times the amount of shoreline that lies behind it.

20 Claims, 9 Drawing Sheets

ARTIFICIAL ISLAND AND METHOD OF CONSTRUCTION THEREOF

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

Field of the Invention

This invention relates to a method of construction of an artificial island.

BRIEF DESCRIPTION OF THE INVENTION

Along the coastlines of the United States and other countries, barrier islands protect the mainland and wetlands from damage caused by storms. In locations where no barrier islands exist, shore erosion is a serious problem. To reduce the impact of storms on the shoreline wetlands, the instant invention is a method of making artificial barrier islands. The method consists of driving a series of piles in the shape of the island, attaching a number of wire mesh sections, to form a fence around the perimeter of the piles, connecting the tops of the piles with cables, and then filling the formed enclosure with rock, reworked concrete or suitable fill material. Once the fill material has reached the water surface, it can be covered with suitable soil and vegetation to create the island. When complete, the piles and mesh are hidden below the surface and the formed island takes on a natural appearance.

In this way, the artificial island acts as a barrier to storms, thus protecting the shoreline wetlands. Moreover, the artificial island creates an ideal habitat for birds, fish and amphibians. It is estimated that one island protects 10 times the amount of shoreline that lies behind it in certain applications.

DETAILED DESCRIPTION OF THE INVENTION

Figure 1:
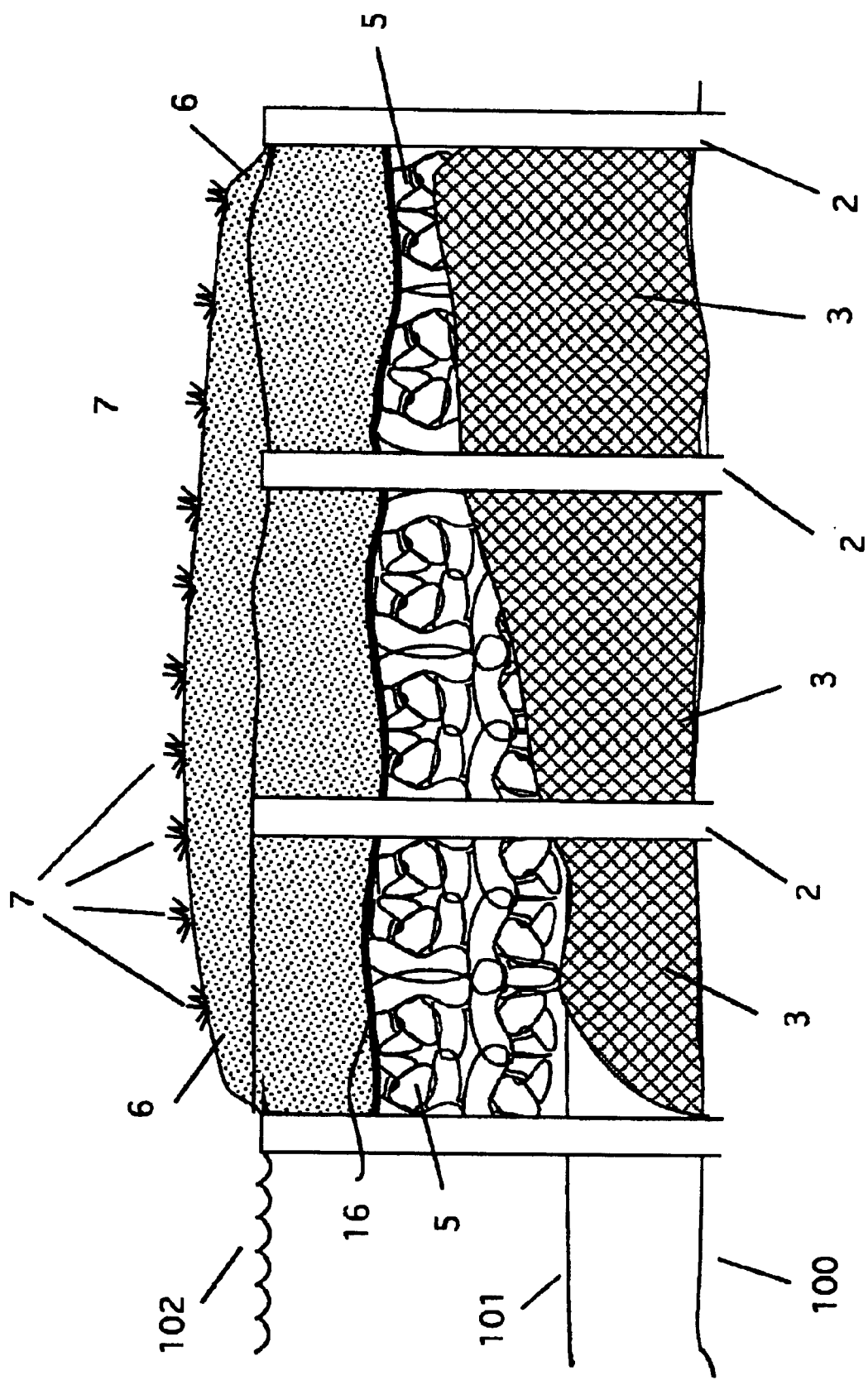
FIG. 1 is a side sectional view of he invention.

Referring now to FIG. 1, a side view of the island is presented showing the interior and exterior structure. FIG. 1 shows an assembled island 1. The island has a number of piles 2 formed about a perimeter; see also below. The piles are driven into the sub bottom 100. A mesh fence 3 is attached to the piles, as discussed below. The fence extends from below the muckline (when present) 101 to the top surface of the water 102, (see FIG. 3). In FIG. 1, the mesh is only partially shown to allow the inner components to be shown. The combination of piles and fencing forms a "corral" structure (see FIG. 2) to hold the island components in place.

The island components are placed within the "corral" structure. Extending from the muckline to a point near the surface of the water is a mass of riprap material 5. Above the riprap is a layer of geotextile fabric 16 that is used to retain the cover soil 6.

Above the geotextile fabric 16 is a layer of cover fill 6. The cover fill extends above the water line for a specific distance to form the portion of the island that is visible. This cover may then be planted with indigenous vegetation 7 to prevent erosion and to create habitat for wildlife (birds, reptiles and amphibians).

Figure 2:
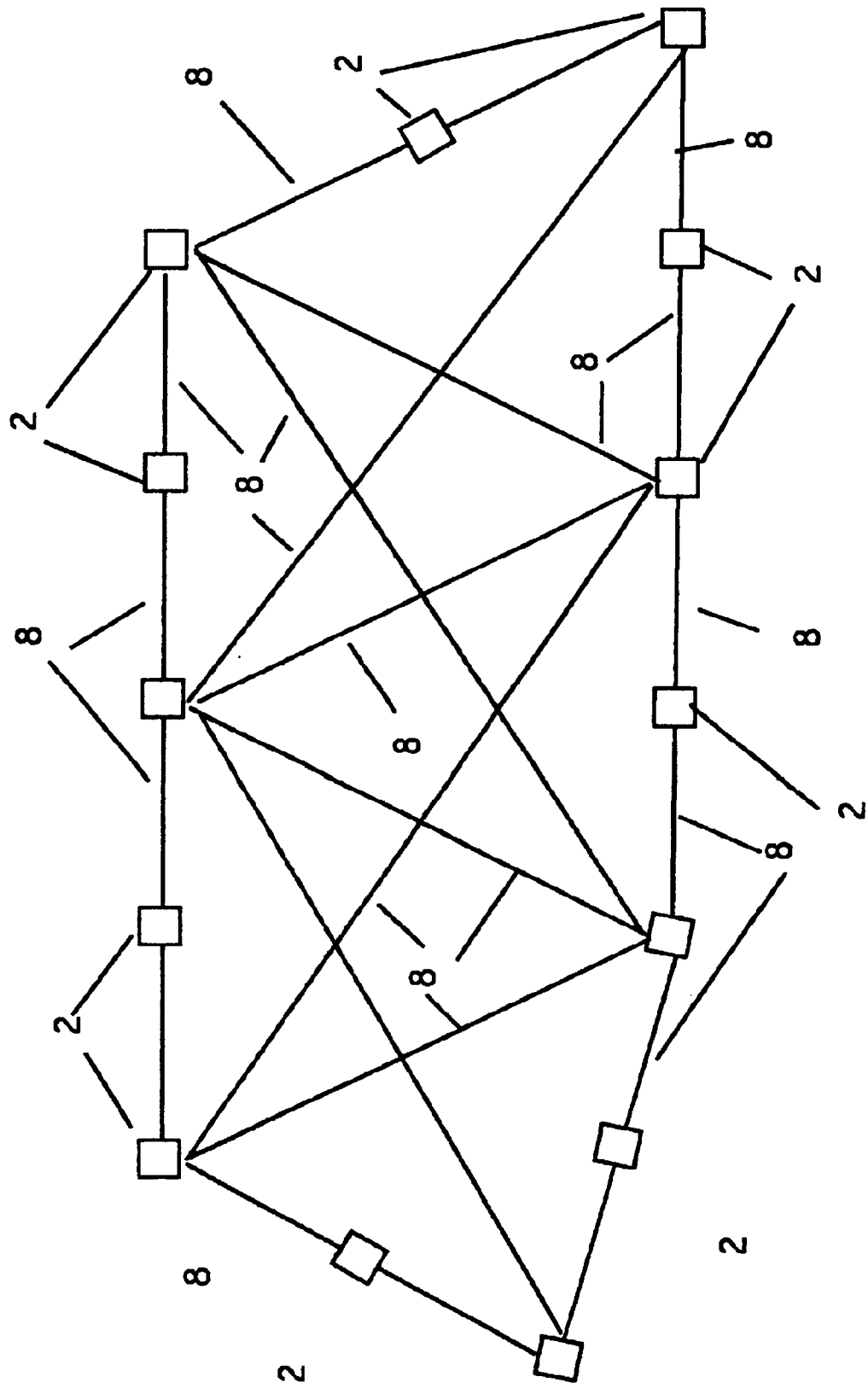
FIG. 2 is a diagrammatic plan view of the invention showing the plan of cross ties.

FIG. 2 is a plan view of the basic "corral" structure. Note that the piles are tied together by cables (stainless steel cables for marine environment) 8, which are discussed below. The cables 8 extend around the perimeter of the island 1 as shown and they run across the center of the island to anchor opposite pilings as shown. The details of the cables and their connections are discussed below.

Figure 3:
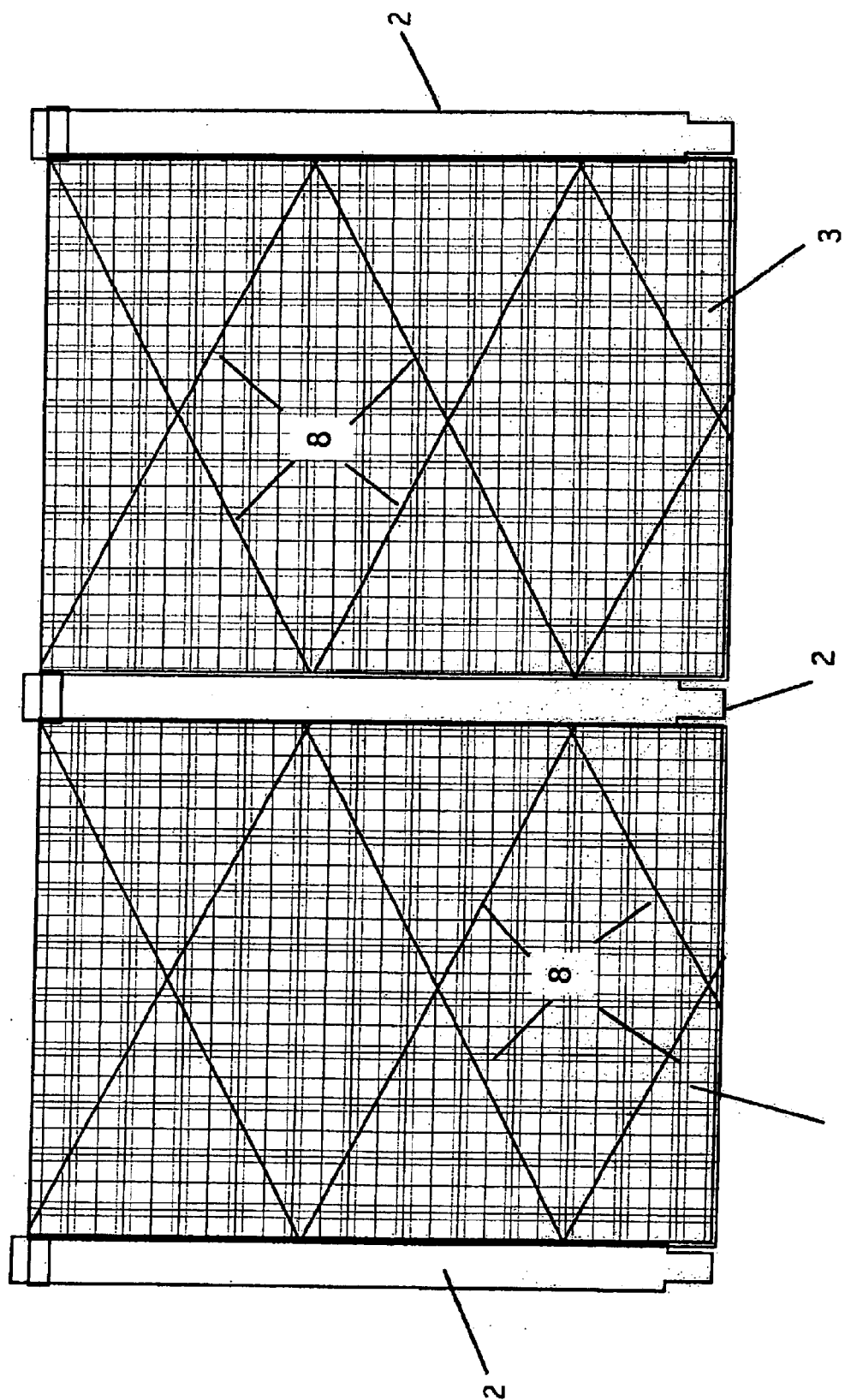
FIG. 3 is a side view of a portion of a typical island fence section.

FIG. 3 is a side detail view showing three piles and two mesh sections. The piles 2 can be made of steel, wood or concrete, depending on the location and site-specific design considerations. Although all of the piles may be made of the same material, it is also possible to alternate piles of different materials. For example, concrete piles can be alternated with wooden piles or steel point bearing piles. The mesh fence 3 is made of a wire mesh. In the preferred embodiment, the fence 3 is made of stainless steel welded wire mesh that is reinforced with stainless steel cables 8 for marine environment. Wire mesh of 8 gauge is preferred but mesh strength is calculated for site-specific environments. The mesh is attached to the piles using a clip system that is described below.

Figure 4:
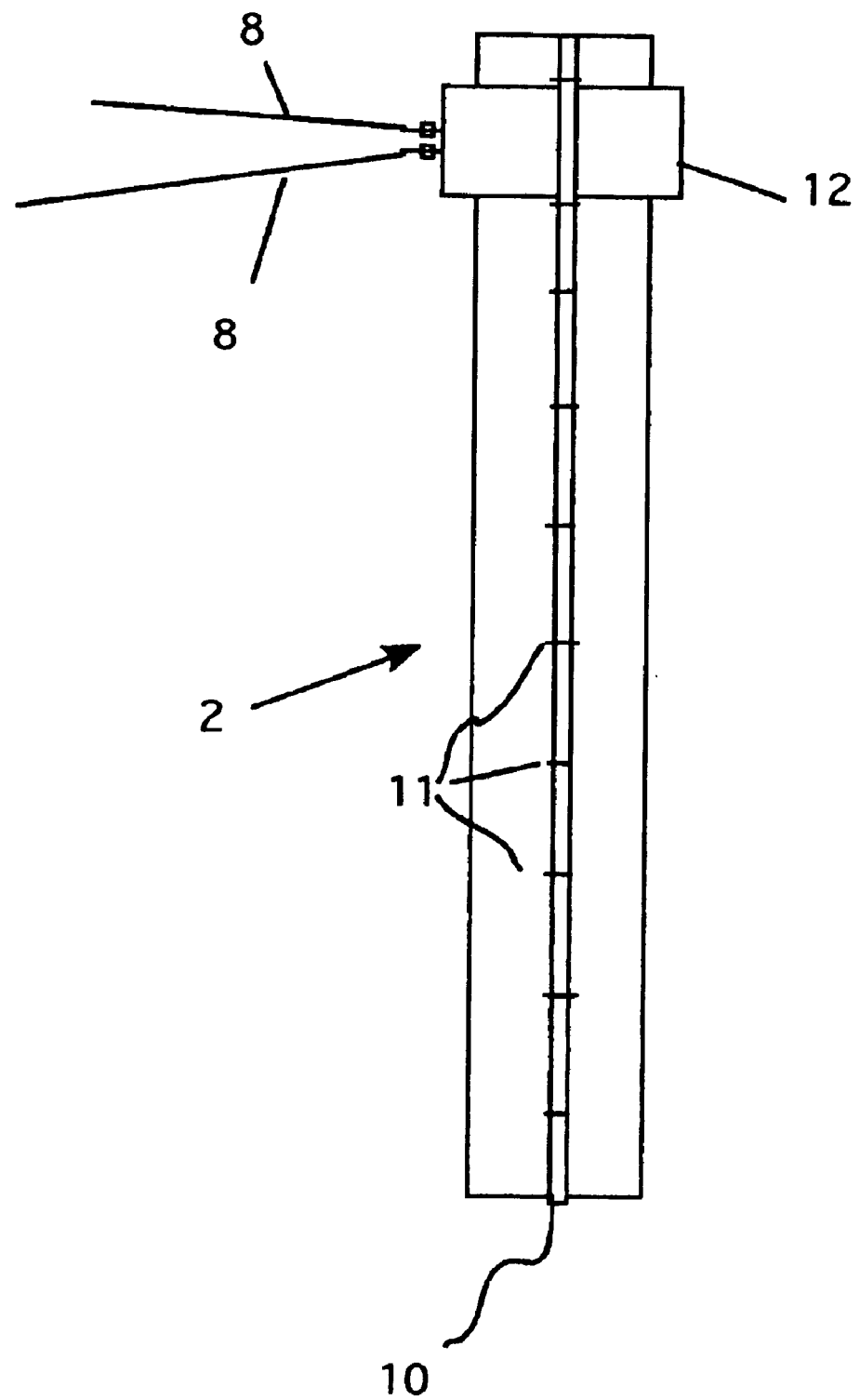
FIG. 4 is a detail side view of a typical pile.

FIG. 4 is a detail side view of a typical pile 3. A stainless steel "T"-rail 10 is installed in two sides (see FIG. 5). The "T"-rail 10 is used to secure the wire mesh 3 with stainless steel clips 11 (see also FIG. 6). A header 12 is formed onto the pile. The header is used to secure clamps for the stainless steel cable ties 5.

Figure 5:
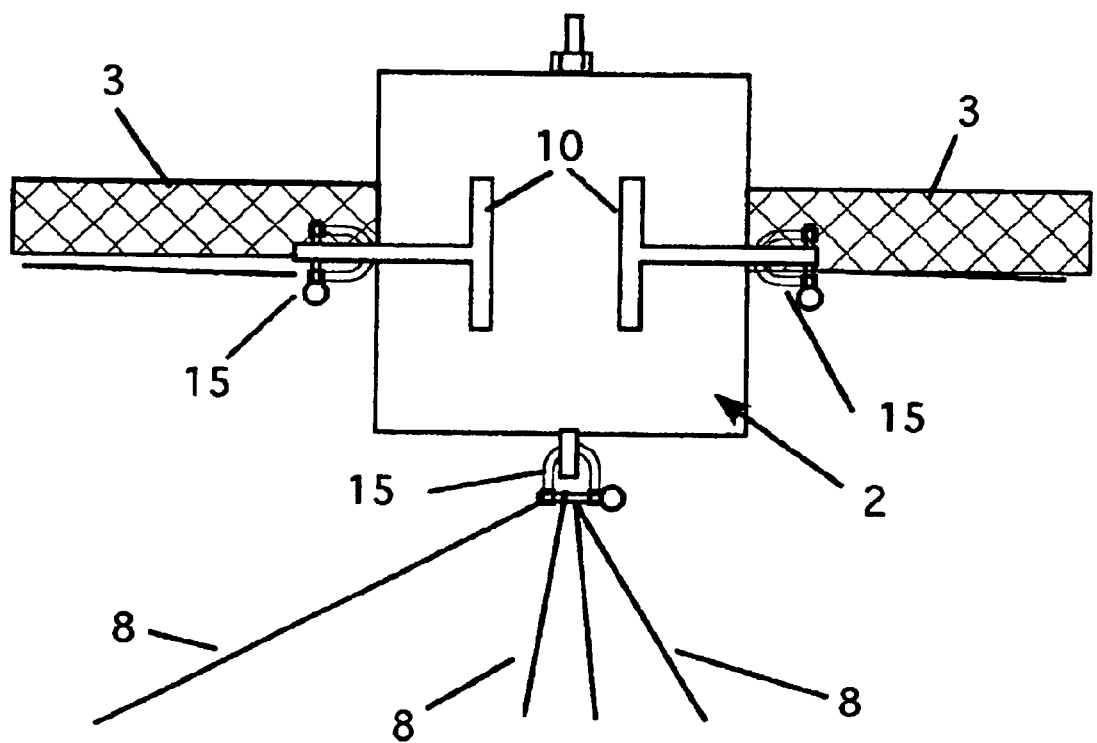
FIG. 5 is a plan view of a typical pile.
Figure 6:
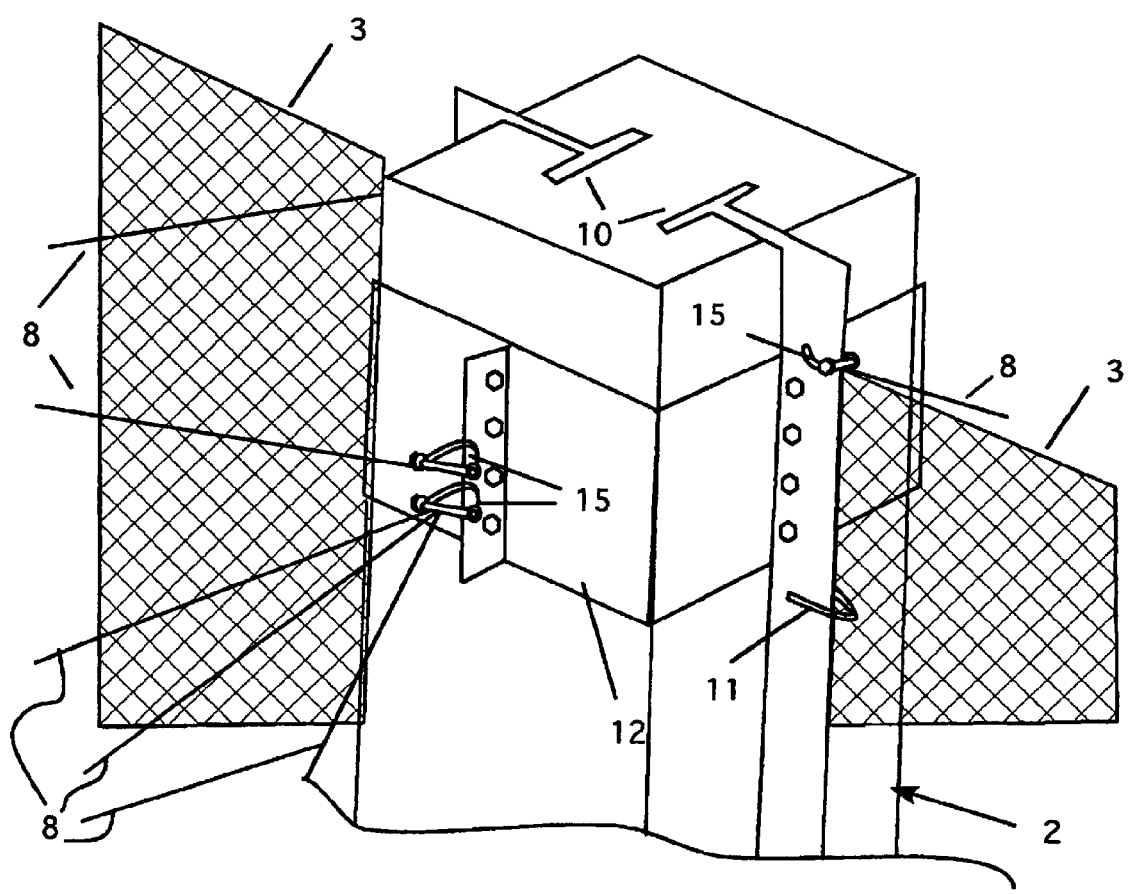
FIG. 6 is a perspective view of a typical pile.

FIG. 5 is a plan view of a typical pile 2. FIG. 6 is a perspective view of a typical pile. In these views, the stainless steel "T"-rails 10 are clearly shown. The wire mesh 3 is shown extending out from the pile laterally. Behind the wire mesh is a layer of riprap material 5. Note the shackles 15 that are connected to the header 12. Note also the stainless steel cables 5 that extend out from the shackles to connect to other piles (see FIG. 2). Note also that FIG. 6 shows the stainless steel clips 11 that secure the mesh 3 to the piles 2.

Figure 7:
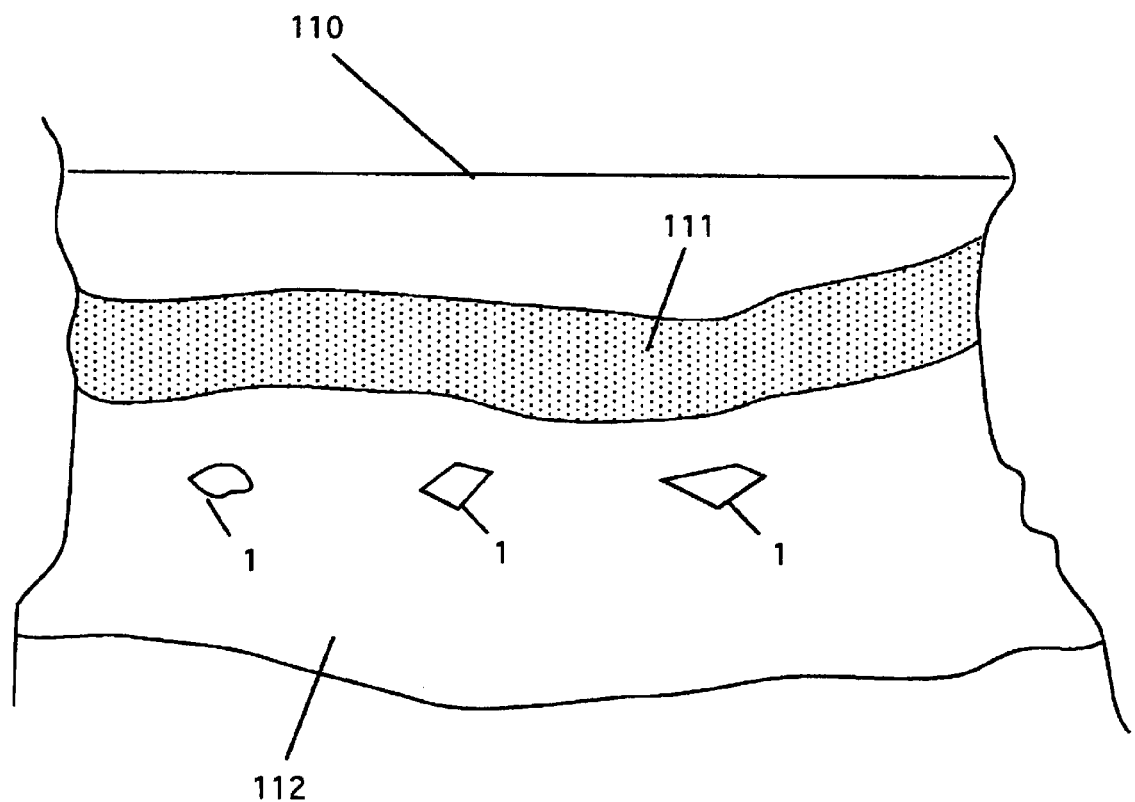
FIG. 7 is a plan environmental view of a typical shoreline with wetlands, showing the placement of the invention is open water in from of the shore.

As discussed below, the artificial islands are intended to be positioned in water in front of or adjacent to wetland areas. FIG. 7 is a plan environmental view of a typical shoreline 110 with wetlands 111, showing the placement of the invention 1 is open water 112 in front of the shore. The islands are arraigned in a line to act as shoreline protection and a barrier for storm surges. The water depth can vary from 5 feet to a maximum of about 45 feet. The minimum water depth is limited by the draft of the barges needed for the construction of the island.

Figure 8:
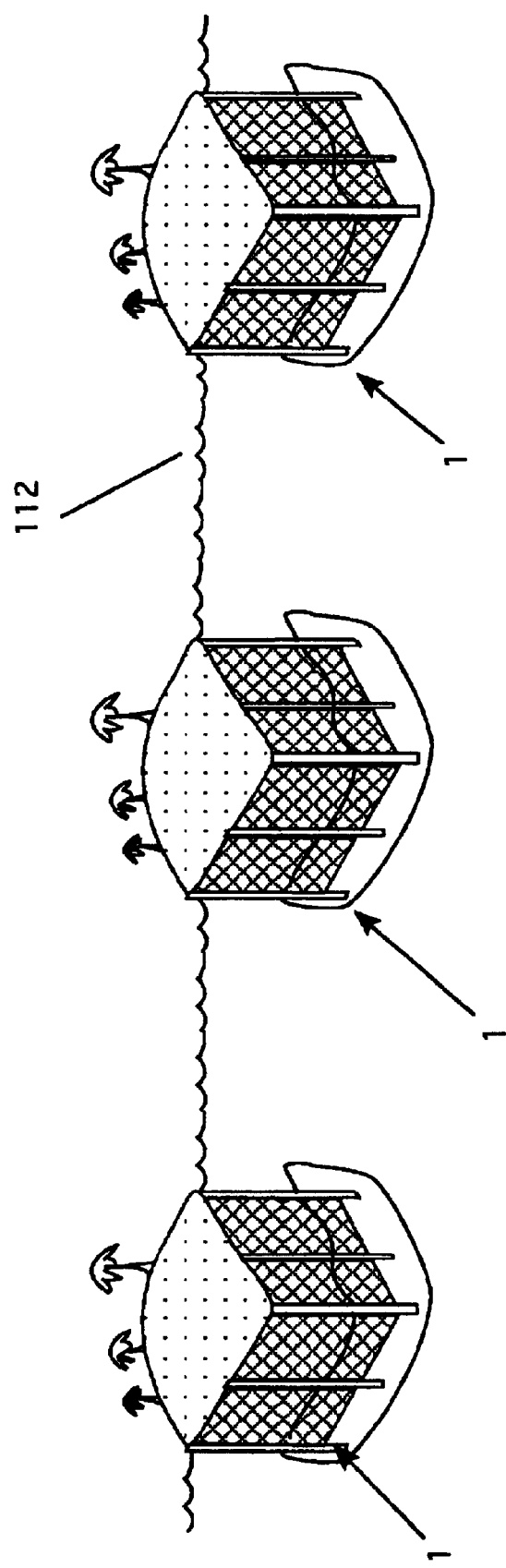
FIG. 8 is an environmental view of a series of islands formed using the invention.

FIG. 8 is an environmental view of a series of islands formed using the invention. Here three islands 1 are shown in water 112. In this way, a row of several islands can be built to minimize damage from storms.

A typical island is formed as follows:

Typically, all work is done from a barge. First, a set of piles is positioned in the shape of the island. The piles can be made of concrete, steel or wood, using well know techniques. The shape of the island is dependent on a number of factors and is always site-specific. Factors such as water depths and currents (speed and direction) as well as wind velocity and storm surge are site specific and will determine the purpose of the island (such as protecting eroding shoreline or wetlands). The environmental processes shall determine the exact shape of the island. These factors are commonly used to design structures such as bridges and other in-water structures and their calculations are well within the scope of ordinary skill in the art.

Once the piles are positioned, they are driven into the bottom at a sufficient depth to meet the design conditions. The length of the piles depends on the depth of the water and subsurface conditions. In the preferred embodiment, the maximum water depth is 45 feet. However, the island can be built in shallower water as needed. Note also that the depth of the water determines the distance of the island from the mainland. The piles are driven so that their tops are at the water surface level (usually measured at low tide for marine environments). Spacing of the piles also depends on the design factors. For example, a spacing of 30 feet between piles is a typical measure. However, this spacing will change with the conditions and is, again, entirely site-specific.

The size of the island depends on the intended use and site-specific conditions. The minimum diameter of the island is calculated, but is also dependent upon the water depth. Typically, the diameter of the island shall be three times the depth of the water. Thus, for a 30-foot water depth, the island diameter should be considered to be at least 90 feet. Using the rule above provides an adequate base to make a stable island.

Once the piles are set, wire mesh is attached to the piles. This mesh runs around the perimeter, forming a corral-like structure. In the preferred embodiment, the wire mesh is stainless steel welded wire mesh, but mesh made of other materials can be used. The wire mesh is pushed down into the bottom, to the level of the sub bottom. It then extends up to the top of the piles, as shown.

Once the "corral" is formed, the tops of the piles are tied together using cables that form tiebacks. The tiebacks are shown in FIGS. 2 and 5. In FIG. 2, a top view of the corral structure is shown. Note how the tiebacks run to piles that are positioned opposite of each other. The tiebacks hold the piles in a vertical position when the island is formed. They keep the piles from splaying out as the "corral" is filled.

Once the "corral" structure is complete, it is filled with riprap material (rock is preferred). The riprap material is delivered on barges. Typically, riprap material is added until it is almost to the surface of the water. The "rock" is then covered with a geotextile mat that extends up to the top of the screen mesh. This matting retains the cover soil in the corral and provides a base for natural vegetation. At that point, soils can be added to build up the island above the surface of the water as desired. Alterations and design considerations for marine environments shall include tidal actions, storm surge and wave frequency.

Finally, the soil is planted with vegetation suitable for the location.

Figure 9:
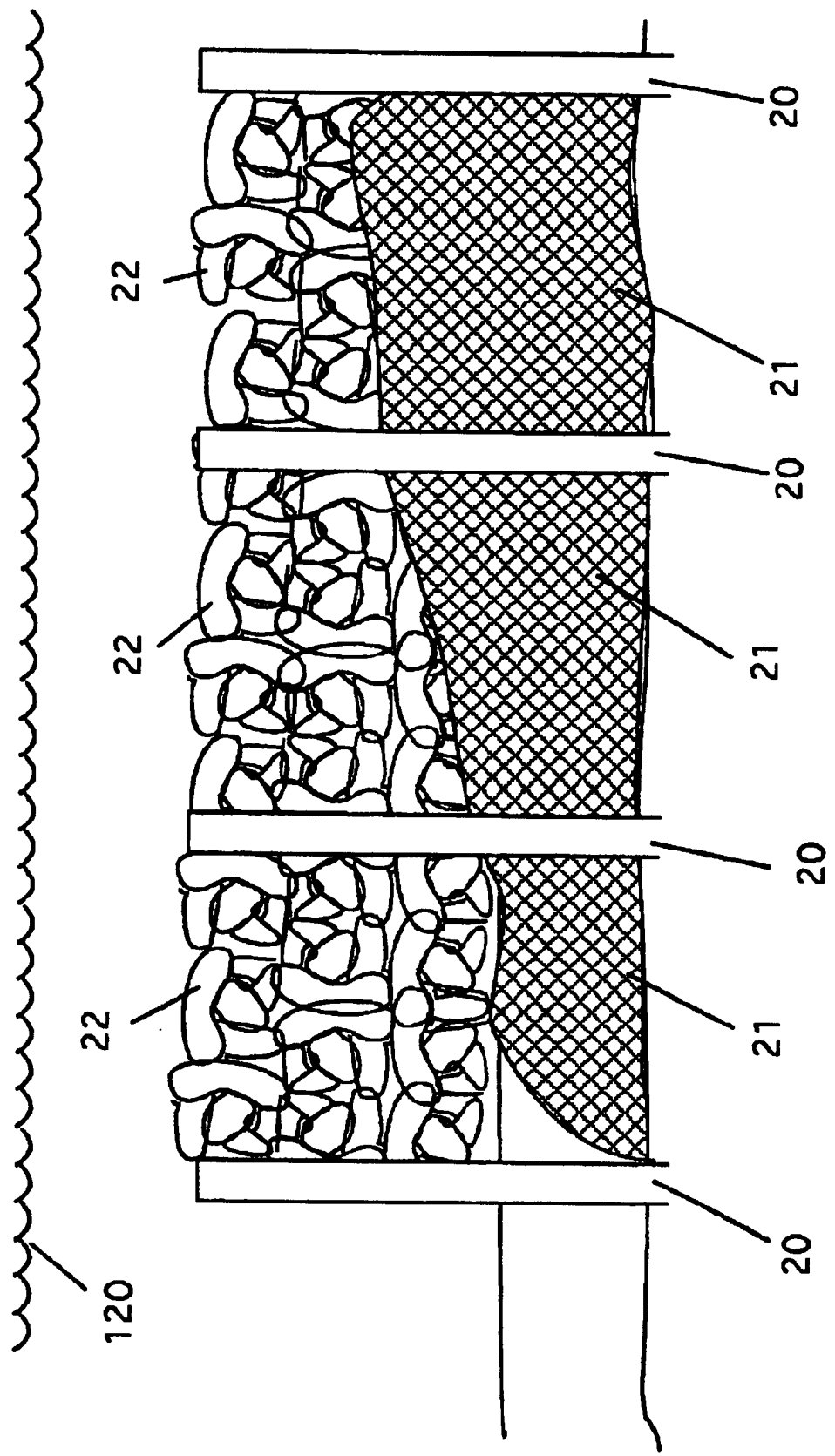
FIG. 9 is a side detail view of an alternative embodiment, in which the invention is used to form an artificial reef.

FIG. 9 shows another embodiment of the invention. Here, the piles 20 are set to a height below the surface of the water 120. For example, the tops of the piles might be 8 feet below the surface at low tide. The "corral" is formed in the same way as discussed above using the wire mesh 21. "Rock" 22 is placed in the structure to the top of the piles 20, however no top cover is used. This structure forms an artificial reef, which acts as a breakwater.

An example of a typical construction follows: To make an island in approximately 30–35 feet of water, fifteen of 70 foot concrete "I" piles are used (note: pile depth is site specific). The piles are driven into the bottom until they extend up from the bottom 30–35 feet, until that are at the level of the low tide. The piles are spaced approximately 30 feet apart forming a shell with a perimeter of approximately 440 feet (this configuration is shown in FIG. 2). Next, 8 ga. stainless steel welded wire mesh is attached to the piles. The mesh is approximately 35–40 feet in height. The mesh is pushed down into the muck layer. A series of stainless steel cables is suspended between the piles in a pattern as shown in FIG. 2. Once the cables are secure, barges loaded with riprap material are positioned and the material is dumped into the enclosure. The riprap is laid to a point approximately 1 foot above the water surface. The rock is then covered with a geotextile mat that extends above the top of the screen mesh. Then quantities of fill dirt are added as cover material until the cover material extends to design height, (in this case approximately 5 feet above the high tide mark). Finally, a number of indigenous plants and trees are added to the island to form a vegetative cover to prevent erosion.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An artificial island formed in a depth of water having a surface comprising:
   a) an outer perimeter fence, said outer perimeter fence being formed by a plurality of piles driven into the bed of a water body in a pattern, and a plurality of wire mesh sheets, attached to said plurality of piles, the combination of piles and wire mesh sheets forming an enclosure;
   b) a quantity of riprap material, placed within said enclosure; and
   c) a quantity of fill soil, placed on top of said quantity of riprap until said quantity of fill soil extend above the surface of the water.

2. The artificial island of claim 1 further comprising a plurality of plants, planted in said quantity of fill soil.

3. The artificial island of claim 1 further comprising a geotextile fabric layer, installed between said quantity of riprap (where required) and said quantity of fill soil.

4. The artificial island of claim 1 wherein the island has a diameter.

5. The artificial island of claim 4 wherein the diameter of the island should be at least three times the depth of the water.

6. The artificial island of claim 1 wherein the wire mesh is welded stainless steel.

7. The artificial island of claim 1 further comprising a plurality of tieback cables, each of said plurality of tieback cables having a first end and a second end, and further wherein the first end of one of said plurality of tieback cables being attached to a pile and the second end of one of said plurality of tieback cables being attached to a second pile.

8. The artificial island of claim 7 wherein the plurality of tieback cables extends across the diameter of the artificial island.

9. The artificial island of claim 1 wherein the piles are selected from the group of: concrete piles, steel piles and wooden piles.

10. The artificial island of claim 9 wherein the plurality of piles are positioned in a pattern of alternating materials of pile.

11. The artificial island of claim 10 wherein the pattern of alternating materials comprises a series having a concrete pile followed by a wooden pile, filed by a concrete pile designed for site specific conditions.

12. An artificial reef formed in a depth of water having a surface comprising:
   a) an outer perimeter fence, said outer perimeter fence being formed by a plurality of piles driven into a water body bed in a pattern, and a plurality of wire mesh sheets, attached to said plurality of piles, the combination of piles and wire mesh sheets forming an enclosure having a diameter;
   b) a quantity of riprap material, placed within said enclosure, wherein said quantity of riprap remains below the surface of the water; and
   c) a plurality of tieback cables, each of said plurality of tieback cabled having a first end and a second end, and further wherein the first end of one of said plurality of tieback cables being attached to a pile and the second end of one of said plurality of tieback cables being attached to a second pile.

13. The artificial reef of claim 12 wherein the plurality of tieback cables extends across the diameter of the artificial island.

14. A method of constructing an artificial barrier in a depth of water having a surface comprising the steps of:
   a) placing a plurality of piles having tops in a geometric pattern in a water body bed;
   b) attaching a plurality of wire mesh to said plurality of piles, thereby forming an enclosure;
   c) attaching a plurality of tieback cables around the perimeter of the enclosure, by attaching each of said plurality of tie back cables to two adjoining piles until all of said plurality of piles are connected by said plurality of tieback cables;
   d) attaching a second plurality of tieback cables, wherein each of said second plurality of tieback cables are attached to oppositely disposed pairs of piles; and
   e) filling said enclosure with a quantity of riprap material.

15. The method of claim 14 further comprising the steps of:
   a) placing a geotextile fabric over said quantity of riprap; and
   b) placing a quantity of fill soil above said quantity of riprap until said of fill soils extends above the surface of said water where site specific conditions require.

16. The method of claim 15 further comprising the step of planting a variety of plants in said quantity of fill soil.

17. The method of claim 14 wherein the piles are selected from the group of: concrete piles, steel piles and wooden piles.

18. The method of claim 17 wherein the plurality of piles are positioned in a pattern of alternating materials of pile.

19. The method of claim 18 wherein the positioning of pattern of alternating materials comprises the steps of:
   a) placing a concrete pile in a desired location;
   b) placing a wooden pile in an adjacent location;
   c) placing a concrete pile in an adjacent location to said wooden pile; and
   d) repeating steps b and c until the perimeter is formed.

20. The method of claim 18 wherein the positioning of pattern of alternating materials comprises the steps of:
   a) placing a concrete pile in a desired location;
   b) placing a steel pile in an adjacent location;
   c) placing a concrete pile in an adjacent location to said steel pile; and
   d) repeating steps b and c until the perimeter is formed.

* * * * *